United States Patent [19]

Kim et al.

[11] Patent Number: 5,729,004
[45] Date of Patent: Mar. 17, 1998

[54] DATA COMMUNICATION DEVICE AND METHOD OF A SMART CARD

[75] Inventors: Jong-Chul Kim, Suwon; Sang-Joe Ra, Seoul, both of Rep. of Korea

[73] Assignee: Samsung Electronics Co., Ltd., Suwon, Rep. of Korea

[21] Appl. No.: 537,962

[22] Filed: Oct. 2, 1995

[30] Foreign Application Priority Data

Sep. 30, 1994 [KR] Rep. of Korea .................. 1994-25042

[51] Int. Cl.$^6$ .................................................. G06K 19/06
[52] U.S. Cl. .......................... 235/492; 235/375; 235/382; 902/26
[58] Field of Search ............................ 235/492, 380, 235/379, 382, 375, 487; 902/2, 4, 26

[56] References Cited

U.S. PATENT DOCUMENTS

| | | | |
|---|---|---|---|
| 4,906,828 | 3/1990 | Harpern | 235/379 |
| 4,908,038 | 3/1990 | Matsumura et al. | 235/379 X |
| 5,109,152 | 4/1992 | Takagi et al. | 235/492 X |
| 5,148,543 | 9/1992 | Tamada et al. | 235/380 X |
| 5,149,945 | 9/1992 | Johnson et al. | 235/380 |
| 5,227,613 | 7/1993 | Takagi et al. | 235/382 X |
| 5,365,047 | 11/1994 | Yamaguchi | 235/492 X |
| 5,418,353 | 5/1995 | Katayama et al. | 235/380 |
| 5,428,684 | 6/1995 | Akiyama et al. | 235/380 X |
| 5,539,825 | 7/1996 | Akiyama et al. | 235/379 X |
| 5,541,985 | 7/1996 | Ishii et al. | 235/379 X |
| 5,550,919 | 8/1996 | Kowalski | 235/379 X |

FOREIGN PATENT DOCUMENTS 63-61389  3/1988  Japan .

Primary Examiner—Donald T. Hajec
Assistant Examiner—Michael G. Lee
Attorney, Agent, or Firm—Cushman Darby & Cushman Intellectual Property Group of Pillsbury Madison & Sutro LLP

[57] ABSTRACT

An input/output device of a smart card according to the present invention comprises a first register having a serial input terminal connected to a terminal serial input/output; a second register having parallel detection terminals, parallel input/output terminals connected to a data bus, and a serial input terminal connected to a serial output terminal of the first register; a third register having a parallel input terminal connected to a ground, a serial input terminal connected to a serial output terminal of the second register, and a serial output terminal connected to the terminal serial input/output; a parity generator which receives parallel output data from the parallel detection terminals of the second register, logically operates upon the parallel output data to generate an operation parity bit which is applied to a parallel input indicator terminal of the first register; and a parity detector which receives a reception parity bit from the first register and the operation parity bit from the parity generator and, in a reception mode, compares the logic states of the reception parity bit and the operation parity bit to obtain a parity detection signal indicating whether parity is correct.

11 Claims, 8 Drawing Sheets

DATA COMMUNICATION DEVICE AND METHOD OF A SMART CARD

BACKGROUND OF THE INVENTION

1. Field of the Invention

The present invention relates to a device and method for a data communication between a smart card and a card reader, and more particularly to the device and method of the smart card for adding a parity bit to transmission data in a transmission mode, and for operating on the reception data to generate an operation parity bit and comparing the operation parity bit with a reception parity bit in a reception mode.

2. Description of the Related Art

Generally, an IC card can be classified as memory cards capable of only reading service information stored on the IC card, and smart cards capable of modifying the information stored on the IC card by performing data communication between the card reader and the IC card. Thus, a memory card has only the memory for storing the service information, whereas a smart card has a central process unit (CPU) for registering, modifying and clearing the service information of the memory.

Smart cards typically use a CPU capable of accessing to the memory device with a control signal applied from an external card reader and a serial I/O device through which data communication with the card reader can be performed in accordance with ISO.7816 recommendation protocol. Thus, with such a smart card, it is possible to register, clear and modify the information stored in the memory device at any time.

Smart cards are also preferred for reasons of security and reliability provided for various service information of the issuer, sub-issuer and holder and private service information of the holder.

FIG. 1 shows a block diagram of a widely used smart card having five terminals VCC, GND, RESET, SCK and SIO (serial input/output) connected to the card reader.

Referring to FIG. 1, the smart card has a program memory 13 for controlling overall operations of the smart card, and a data memory 14 for storing various service information. A mask ROM with masked program is typically used for the program memory 13, and an EEPROM capable of writing and reading the service information is employed for the data memory 14 because, since it is an electrically erasable nonvolatile memory, the EEPROM is capable of preserving the information even though the supply voltage is not applied, and of reading and writing the service information.

The CPU 12 can perform an asynchronous serial data communication with the card reader through an I/O port 11. Thus, the CPU 12 is capable of reading and transmitting the service information of the data memory 14 to the card reader through the I/O port 11, and of storing the service information received from the card reader at the data memory 14.

The program memory 13 stores the control program information which enables CPU 12 to communicate with the I/O port 11 or to access to the data memory 14. Data memory 14 stores all service information on the card holder, issuer, and sub-issuer.

FIG. 2 shows a block diagram of another conventional smart card. Referring to FIG. 2, an I/O port 21 is connected to the card reader through the terminal SIO. The I/O port 21 performing the asynchronous data communication with the card reader, converts serial data received from the card reader into parallel data and converts the parallel data from the CPU into serial data for output to the serial input/output terminal SIO. The CPU 22 analyzes the information received from the I/O port 21, generates the memory selection signal for accessing the information, addresses and control signals and outputs the information to be written through the data bus or outputs the information on the data bus to the I/O port 21. The EEPROM 24 includes a first region for storing the program information and a second region for storing the service information. Either of the first and second regions is selected by the memory selection signal. The EEPROM 24 outputs the information in the selected region to the data bus or receives and stores the information on the data bus in response to the addresses and the control signals. A switchblock 23 connected between the CPU 22 and the EEPROM 24 applies the memory selection signals, the addresses and the control signals from the CPU 22 to the EEPROM 24. In a test mode, the switchblock 23 separates/connects the CPU 22 from/with the EEPROM 24 in accordance with the logic state of the reset signal RESET, thereby testing the access operation of the EEPROM 24 and the operation of the CPU 22.

The controllers of the smart cards of FIGS. 1 and 2, represented by CPU's 12 and 122 respectively, perform asynchronous serial data communication with the card reader in accordance with the transmission method prescribed in ISO-7816-3.

Generally, a serial data transmission frame is composed of eleven bits, i.e., a start bit, a stop bit, eight data bits and a parity bit, and is transmitted in a half duplex mode. The smart card receives data and command from the card reader through the terminal SIO, registers and modifies the information at the data memory region according to the result of the reception, and if necessary, transmits the information registered at the data memory region to the card reader through the terminal SIO.

If the smart card transmits/receives data to/from the card reader as described above, a parity detection method is employed for checking whether or not any data error occurs. In the conventional smart card, however, the controller software performs the function of generating the parity bit to be inserted in the transmission data frame in a transmission mode and the function of detecting the logic state of the parity bit in a reception mode. Thus, in the transmission mode, the conventional smart card generates the even or odd parity bit by adding the 8 data bits. In the reception mode, it detects whether or not there occurs any error in the received 8 bit data and requests the card reader to transmit again if there occurs any error therein. Therefore, in the conventional smart card, the serial I/O device performs only the serial/parallel data conversion, and the transmission and reception operations are controlled by the controller. This results in deteriorating the data communication speed and increasing the program load of the controller.

SUMMARY OF THE INVENTION

It is therefore an object of the present invention to provide a data communication device and method of a smart card having an I/O interface capable of performing a parity function.

It is another object of the present invention to provide a data communication device and method of the smart card which performs logical operations on transmission data and generates and inserts a parity bit into a transmission data frame in a transmission mode, and performs logical operation on reception data, generates and compares an operation parity bit with a reception parity bit, and then outputs a parity detection signal in a reception mode.

To achieve the above objects, the input/output device of a sampt card for performing serial data communication asynchronously with a card reader include, in one embodiment:

a first register having a serial input terminal connected to a terminal serial input/output;

a second register having parallel detection terminals, parallel input/output terminals connected to a data bus, and a serial input terminal connected to a serial output terminal of the first register;

a third register having a parallel input terminal connected to a ground, a serial input terminal connected to a serial output terminal of the second register, and a serial output terminal connected to the terminal serial input/output;

a parity generator which receives parallel output data from the parallel detection terminals of the second register, logically operates upon the parallel output data to generate an operation parity bit which is applied to a parallel input indicator terminal of the first register; and a parity detector which receives a reception parity bit from the first register and the operation parity bit from the parity generator and, in a reception mode, compares the logic states of the reception parity bit and the operation parity bit to obtain a parity detection signal indicating whether parity is correct.

BRIEF DESCRIPTION OF THE DRAWINGS

In the detailed description of the preferred embodiments of the present invention presented below, reference is made to the accompanying drawings, in which.

DETAILED DESCRIPTION OF THE PREFERRED EMBODIMENT

Although the specific details relating to parity generation and the like are provided in the following detailed descriptions, for an overall understanding of the present invention, it should be noted that such details are known by one of ordinary skill in the art.

Figure 1:
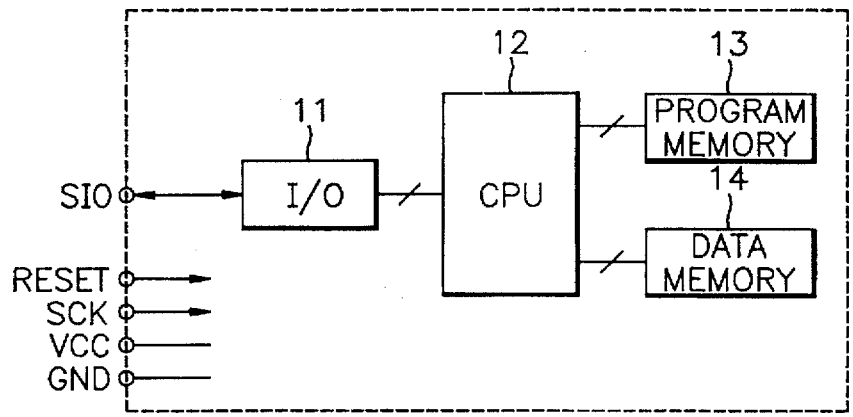
FIG. 1 is a diagram showing a block diagram of a conventional smart card.
Figure 2:
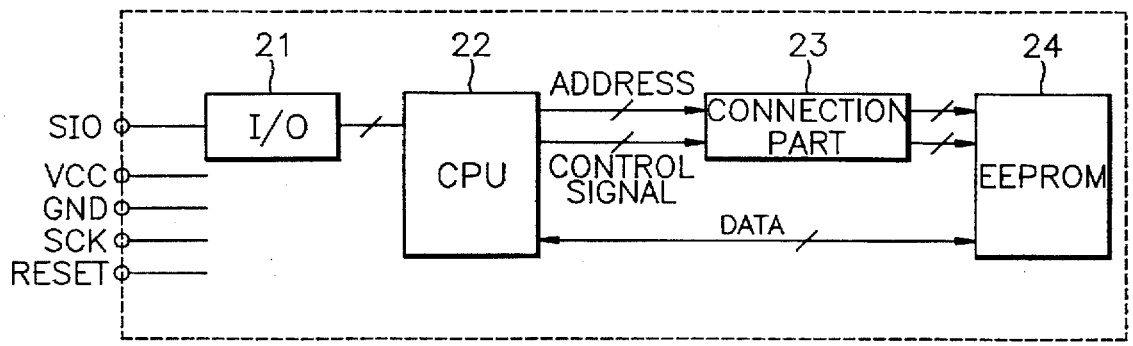
FIG. 2 is a diagram showing a block diagram of another conventional smart card.
Figure 3:
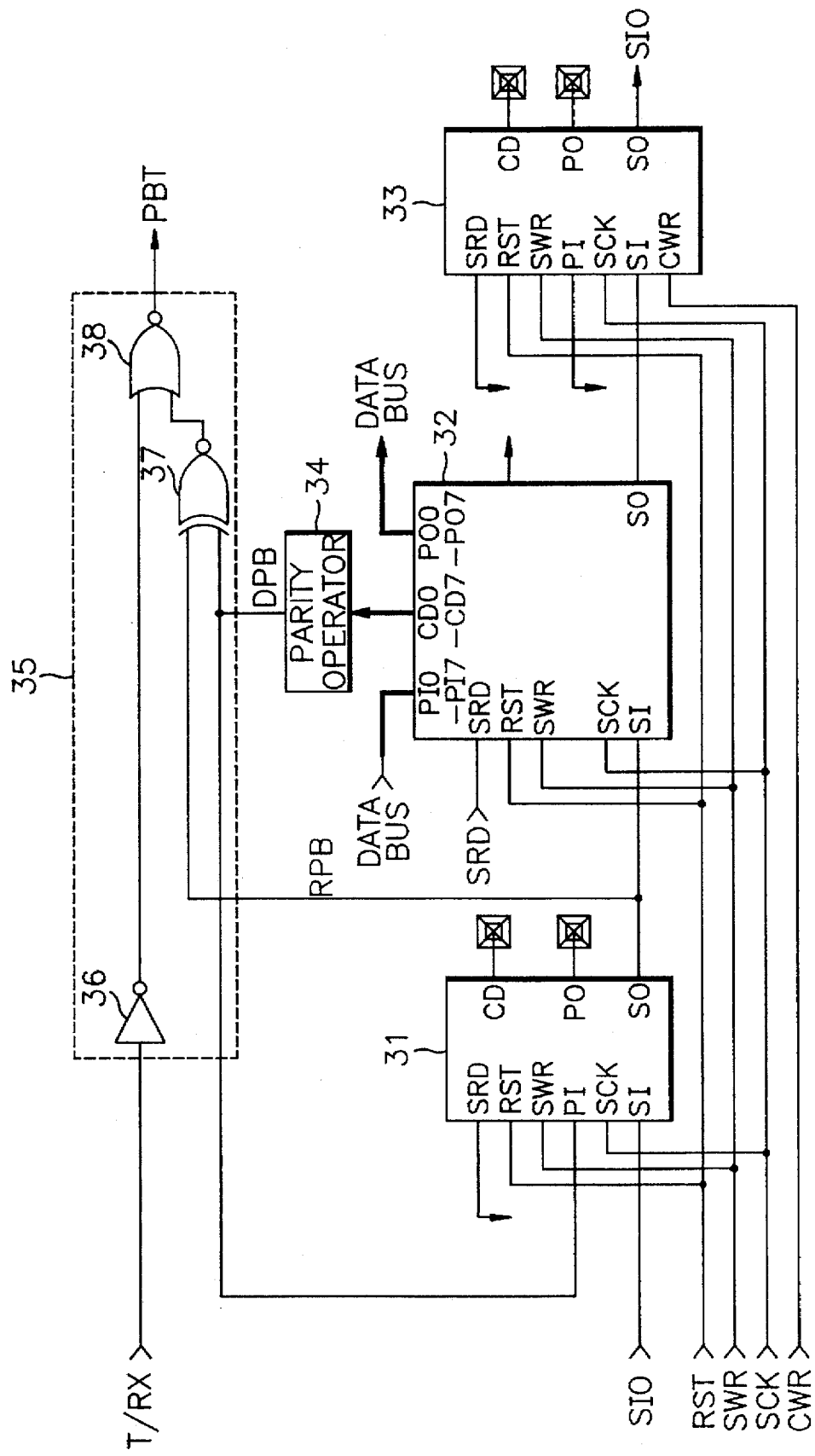
FIG. 3 is a diagram showing the construction of an I/O interface in the smart card according to the present invention.
Figure 11:
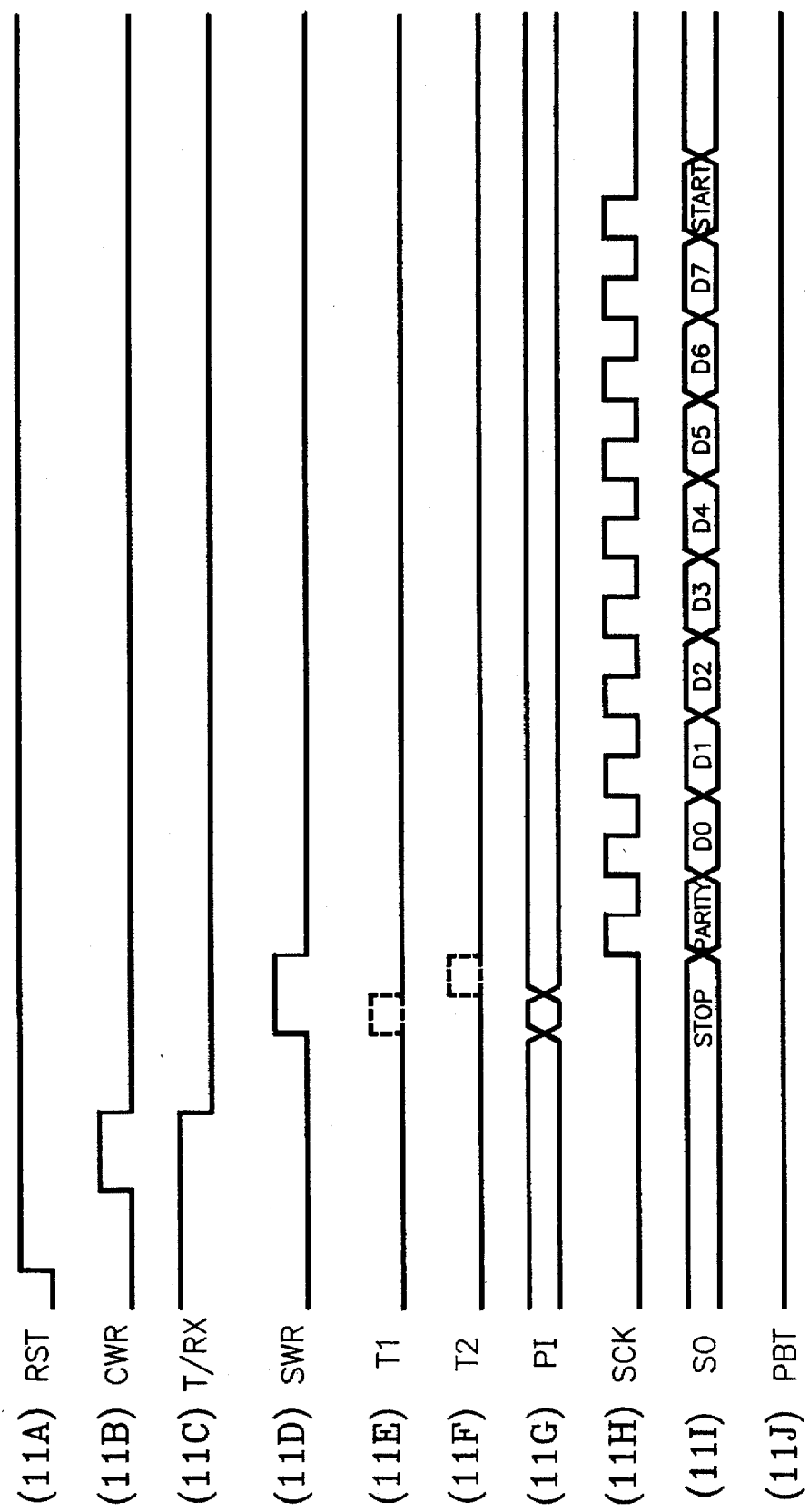
FIG. 11 is a waveform diagram showing the operation of the I/O interface in a transmission mode according to the present invention.
Figure 12:
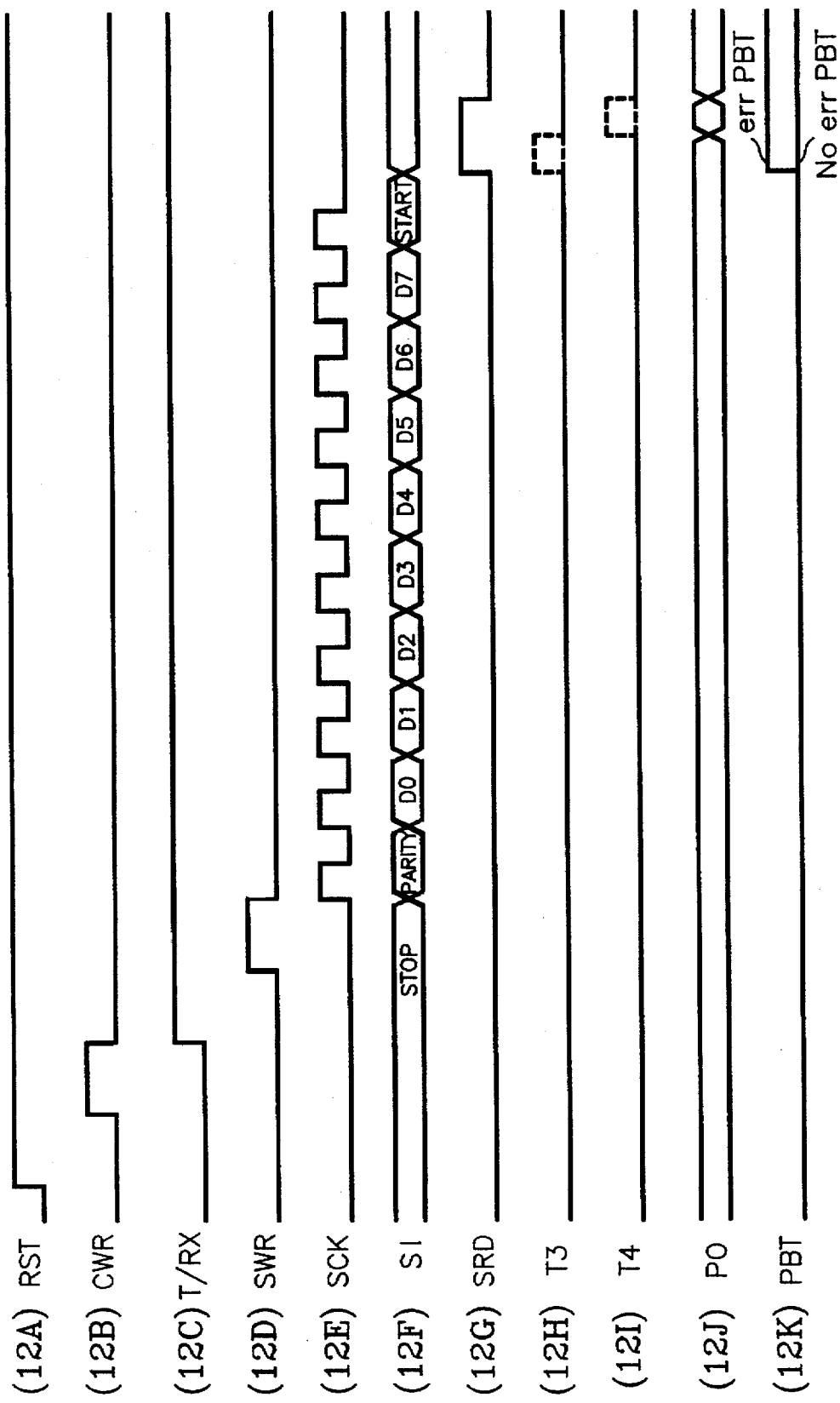
FIG. 12 is a waveform diagram showing the operation of the I/O interface in a reception mode according to the present invention.

FIG. 3 illustrates a serial I/O device 30 according to the present invention. The characteristics of control signals used by serial I/O device 30 are illustrated in FIGS. 11 and 12.

Referring to FIG. 3, the steps of generating and inserting the parity bit in the transmission data frame and of operating the parity bit in the received transmission frame data will now be described. A first register 31 has a serial input indicator terminal SI connected to a terminal SIO, and a parallel input indicator terminal PI connected to an operation parity bit DPB. At the reception of a write signal SWR, the first register 31 loads the operation parity bit DPB received through the parallel input indicator terminal PI, and at the reception of a shift clock SCK, it shifts and outputs the loaded operation parity bit DPB or the serial data received at the terminal SIO to a serial output terminal SO. Thus, in the transmission mode, the first register 31 loads the operation parity bit DPB and then outputs the operation parity bit DPB to the serial output terminal SO in response to the shift clock SCK. In the reception mode, it stores the parity bit applied to the terminal SIO, and outputs a reception parity bit RPB through the serial output terminal SO.

Figure 4:
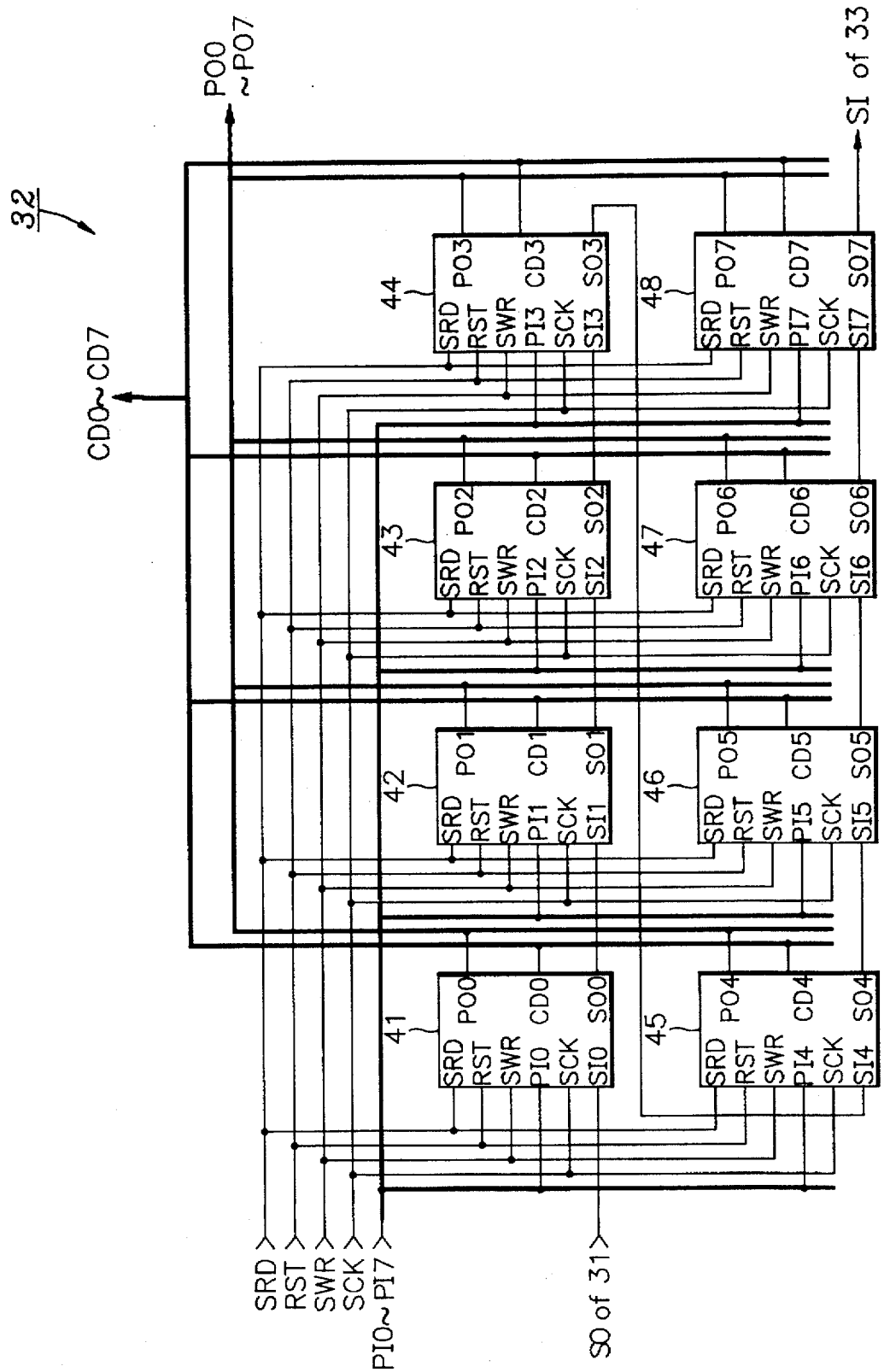
FIG. 4 is a diagram showing a second register in FIG. 3.

A second register 32 has eight bit data registers, illustrated in more detail in FIG. 4. In the second register 32, serial input terminals SI are respectively connected to the serial output terminals SO of their preceding data registers, the serial output terminals SO to the serial input terminals SI of their following data registers, the parallel input/output terminals PI0 to PI7 and PO0 to PO7 to the corresponding data bits on the data bus, and the parallel detection terminals CD0 to CD7 to the input terminal of the parity operator 34. The second register 32 is initialized at the reception of the reset signal RST, and loads and outputs the 8 bit data received at the parallel input terminals PI0 to PI7 to the parallel detection terminals CD0 to CD7 at the reception of the write signal SWR. When the read signal SRD is received, the second register 32 outputs the stored 8 bit data to the parallel detection terminals CD0 to CD7 and to the parallel output terminals PO0 to PO7, and when the shift clock SCK is received, it shifts and outputs the stored 8 bit data to the following data register. Thus, in the transmission mode, the second register 32 loads the 8 bit data received through the parallel input terminals PI0 to PI7 and outputs the 8 bit data to the parallel detection terminals CD0 to CD7 in response to the write signal SWR, and shifts and outputs the loaded data and the data received through the serial input terminal SI to the following data register in response to the shift clock SCK. And in the reception mode, the second register 32 outputs the data received through the serial input terminal SI to the following data register in response to the shift clock SCK, and outputs the 8 bit data to the parallel output terminals PO0 to PO7 and to the parallel detection terminals CD0 to CD7 in response to the read signal SRD.

A third register 33 has a serial input terminal SI connected to the serial output terminal SO of the last data register of the second register 32, a serial output terminal SO connected to the terminal SIO, and a parallel input terminal PI connected to the ground. If the communication start signal CWR is received, the third register 33 is initialized to perform the data communication. And if the write signal SWR is received, the third register 33 loads the ground voltage through the parallel input terminal PI, and outputs the loaded data to the terminal SIO in response to the shift clock SCK. Thus, in the transmission mode, the third register 33 loads the ground voltage received through the parallel input terminal PI as the start bit in response to the write signal SWR, and outputs the loaded data and the data received through the serial input terminal SI to the terminal SIO in response to the shift clock SCK.

A parity operator 34 receives the parallel data outputted from the parallel detection terminals CD0 to CD7 of the second register 32, logically operates upon the received parallel data, and then generates the operation parity bit DPB. In the transmission mode, the parity operator 34 generates the operation parity bit DPB by logically operating in the data on the data bus, and in the reception mode, it generates the operation parity bit DPB by logically operating upon the data outputted from the card reader.

A parity detector 35 comprises an exclusive NOR gate 37 for exclusively NORing the reception parity bit RPB outputted from the first register 31 and the operation parity bit DPB outputted from the parity operator 34, an inverter 36 for inverting the communication mode signal T/RX, and a NOR gate 38 for NORing the output of the inverter 36 and the output of the exclusive NOR gate 37 and then outputting a parity detection signal PBT. In the reception mode, if the logic of the reception parity bit RPB is identical to that of the operation parity bit DPB, the parity detector 35 generates the parity detection signal PBT indicating that the reception data are normal, and otherwise, it generates the parity detection signal PBT indicating that there occurs an error in the reception data.

FIG. 4 shows further details of the second register 32 composed of eight data registers 41 to 48. The data registers 41 to 48 share the control signals SRD, RST, SWR, and SCK and the parallel input/output terminals and parallel detection terminals PI7 to PI0, PO7 to PO0, and CD7 to CD0. The serial input terminal SI0 of the data register 41 is connected to the serial output terminal SO of the first register 31, the serial output terminal SO7 of the data register 48 is connected to the serial input terminal SI of the third register 33, and the serial input terminals SI1 to SI7 of the data registers 42 to 48 are respectively connected to the serial output terminals SO0 to SO6 of their preceding data registers 41 to 47.

In the transmission mode, the data registers 41 to 48 load the data received through the corresponding parallel input terminals PI0 to PI7 in response to the write signal SWR, to output the loaded data to the parallel detection terminals CD0 to CD7, and sequentially shift the stored data and the data received at the serial input terminals SI from their preceding data registers in response to the shift clock SCK, to output to the serial output terminals SO. And in the reception mode, the data registers 41 to 48 shift the data outputted from their preceding data registers through their serial input terminals SI, and if the read signal SRD is received, output the stored data to the parallel output terminals PO0 to PO7 and to the parallel detection terminals CD0 to CD7.

Figure 5:
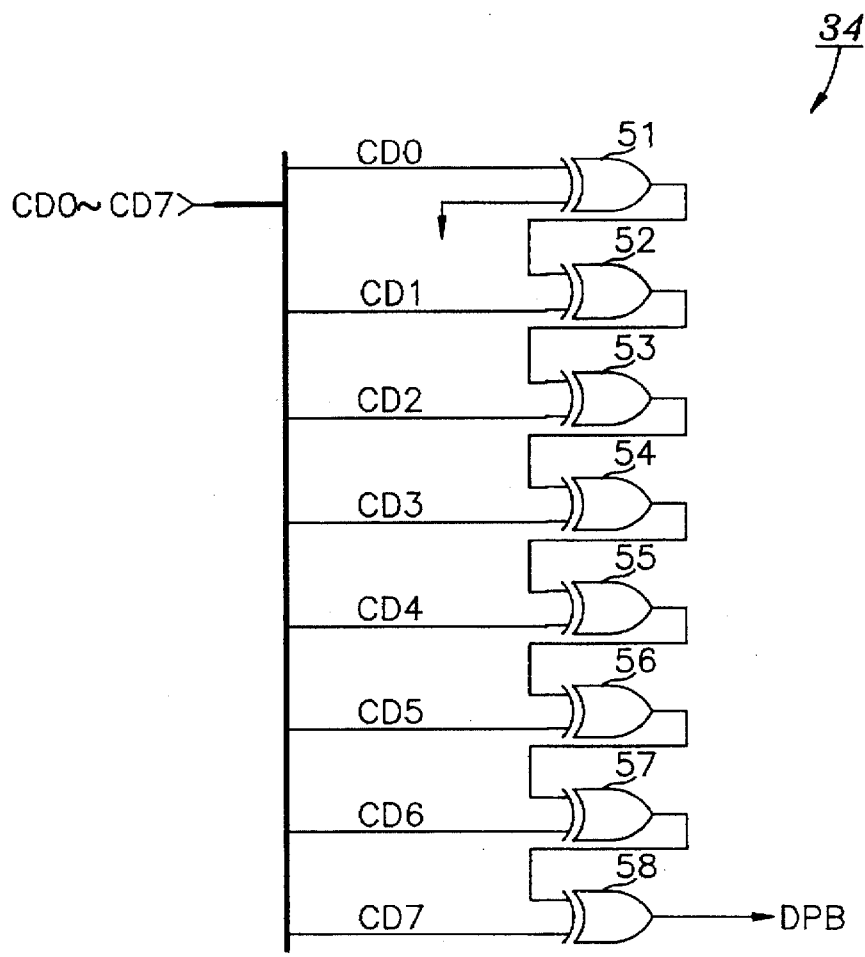
FIG. 5 is a diagram showing a parity operator in FIG. 3.

FIG. 5 is a detailed circuit diagram of the parity operator 34 generating an even parity. The parity operator 34 is composed of eight exclusive OR gates 51 to 58. The exclusive OR gate 51 has one end connected to the ground and the other end receiving the output data of the parallel detection terminal CD0. One ends of the exclusive OR gates 52 to 58 are respectively connected to the corresponding output data of the parallel detection terminals CD1 to CD7, and the other ends thereof are respectively connected to the outputs of the exclusive OR gates 51 to 57. Thus, after the logic operation of the 8 bit data of the parallel detection terminals CD0 to CD7, if the total number of the logic ones is an even number, the parity operator 34 outputs the operation parity bit DPB of logic "0" through the exclusive OR gate 58, and if the total number of the logic ones is an odd number, the operation parity bit DPB of logic "1" is outputted. In case of connecting the exclusive OR gate 51 to the power supply voltage instead of the ground voltage, the parity operator 34 generates the odd parity. In this case, if the total number of the logic ones is an even number, the operation parity bit DPB of logic "1" is outputted and if the total number of the logic ones is an odd number, the operation parity bit DPB of logic "0" is outputted.

In the transmission mode, the parity operator 34 logically operates upon the data outputted to the data bus, and generates and applies the operation parity bit DPB to the parallel input terminal PI of the first register 31, and in the reception mode, it logically operates upon the data outputted from the card reader and generates and applies the operation parity bit DPB to the parity detector 35.

Figure 6:
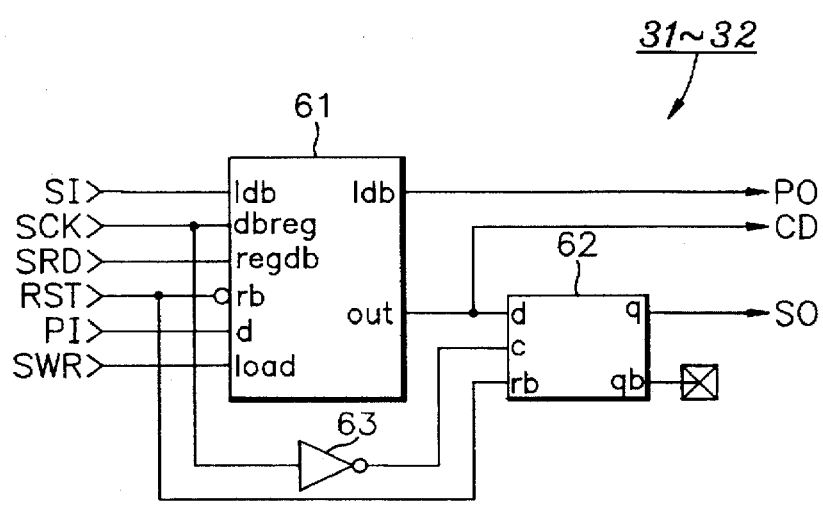
FIG. 6 is a diagram showing details of the first and second registers in FIG. 3.

FIG. 6 shows further details of the first and second registers 31 and 32 of FIGS. 3 and 4. A parallel data processor 61 has an input terminal composed of SCK, SRD, SWR, RST, the parallel input terminal PI receiving the data bits on the data bus and the serial input terminal SI receiving the data outputted from the serial output terminal SO of the preceding data register, and an output terminal composed of the parallel output terminal PO and the parallel detection terminal CD.

A serial data processor 62 receives the output of the parallel detection terminal CD as data, the inverted shift clock $\overline{SCK}$ as the clock signal, and the reset signal RST as the initialization signal, and the serial output terminal SO is used as its output terminal.

Figure 7:
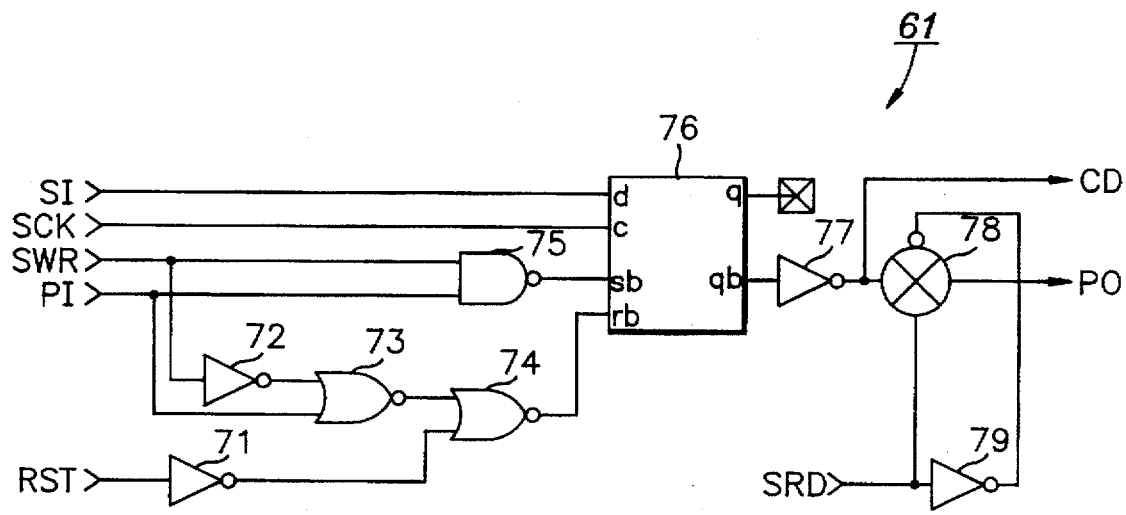
FIG. 7 is a diagram showing details of the parallel data processor in FIG. 6.

FIG. 7 shows the construction of the parallel data processor 61 of FIG. 6. A NOR gate 73 NORs the write signal SWR inverted through an inverter 72 and the data received through the parallel input terminal PI. A NOR gate 74 NORs the output of the NOR gate 73 and the reset signal RST inverted through an inverter 71 and then outputs to the terminal rb in a detection data output interface 76. The NAND gate 75 NANDs the write signal SWR and the data received through the parallel input terminal PI and then outputs to the terminal sb in the detection data output interface 76. The detection data output interface 76 receives the data applied through the serial input terminal SI at the terminal d and the shift clock SCK at the terminal c. Thus, the detection data output interface 76 loads the data applied through the parallel input terminal PI in response to the write signal SWR, and shifts the data applied through the serial input terminal SI in response to the shift clock SCK. The signal outputted through the terminal qb of the detection data output interface 76 is applied to the parallel detection terminal CD through an inverter 77.

The output of the inverter 77 is also applied to the input terminal of a transmission gate 78. The transmission gate 78 receives the read signal SRD as a first gate signal and the inverted read signal $\overline{SRD}$ passed through an inverter 79 as a second gate signal. The transmission gate 78 is turned on in response to the read signal SRD, to output the output of the inverter 77 to the parallel output terminal PO.

Hence, in the transmission mode, the parallel data processor 61 loads the data received through the parallel input terminal PI in response to the write signal SWR, and shifts the loaded data and the serial data received through the serial input terminal SI in response to the shift clock SCK. In the reception mode, the parallel data processor 61 shifts and outputs the serial data received through the serial input terminal SI to the parallel detection terminal CD, and if the read signal SRD is received, switches and outputs the output of the inverter 77 to the parallel output terminal PO.

Figure 8:
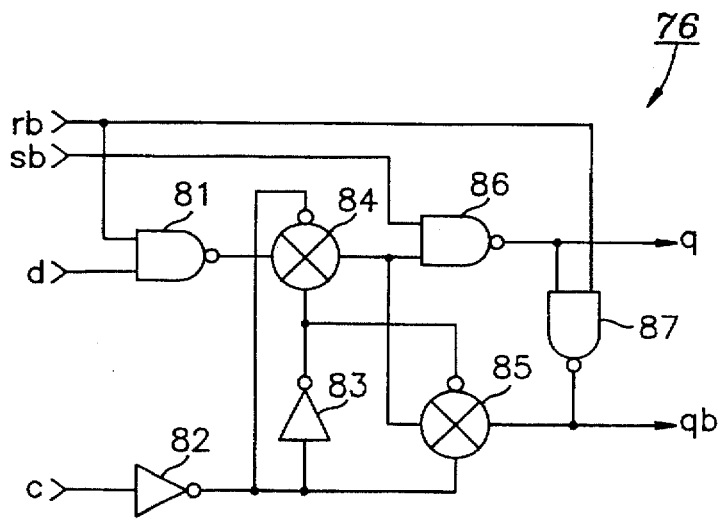
FIG. 8 is a diagram showing details of the detection data output interface in FIG. 7.

FIG. 8 is a detailed circuit diagram of the detection data output interface 76 of FIG. 7. A NAND gate 81 NANDs the signal received at the terminal rb and the signal received at the terminal d. An inverter 82 inverts the output of the terminal c, and an inverter 83 inverts the output of the inverter 82. A transmission gate 84 receives the output of the NAND gate 81. In addition, the transmission gate 84 receives the output of the inverter 82 as a first gate signal and the output of the inverter 83 as a second gate signal, thus outputting the serial data applied through the NAND gate 81 at the reception of the shift clock SCK. A transmission gate 85 receives the output of the transmission gate 84, and receives the output of the inverter 83 as a first gate signal and the output of the inverter 82 as a second gate signal, thus outputting the output of the transmission gate 84 to the terminal qb at the reception of the shift clock SCK. A NAND gate 86 NANDs the output of the terminal sb and the output of the transmission gate 84. A NAND gate 87 NANDs the output of the terminal rb and the output of the NAND gate 86 and then outputs to the terminal qb.

Figure 9:
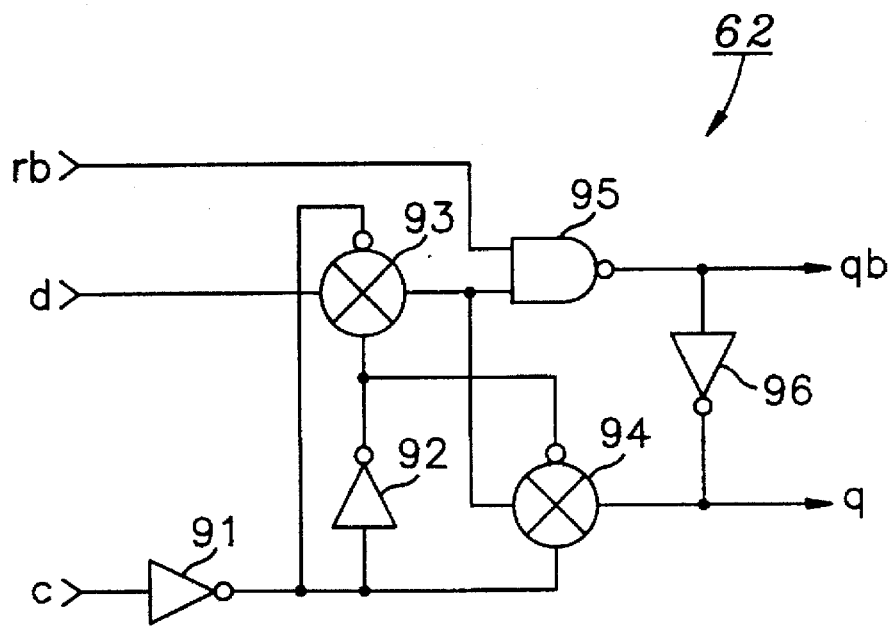
FIG. 9 is a diagram showing details of the serial data processor in FIG. 6.

FIG. 9 is a detailed circuit diagram of the serial data processor 62 of FIG. 6. An inverter 91 inverts the output of the terminal c, and an inverter 92 inverts the output of the inverter 92. A transmission gate 93 receives the output of the terminal d, and receives the output of the inverter 91 as a first gate signal and the output of the inverter 92 as a second gate signal. A transmission gate 94 receives the output of the transmission gate 93, and receives the output of the inverter 92 as a first gate signal and the output of the inverter 91 as a second gate signal, and then outputs the output of the transmission gate 93 to the terminal q. A NAND gate 95 NANDs the output of the terminal rb and the output of the transmission gate 93, and an inverter 96 inverts the output of the NAND gate 95 and then outputs to the terminal q.

Figure 10:
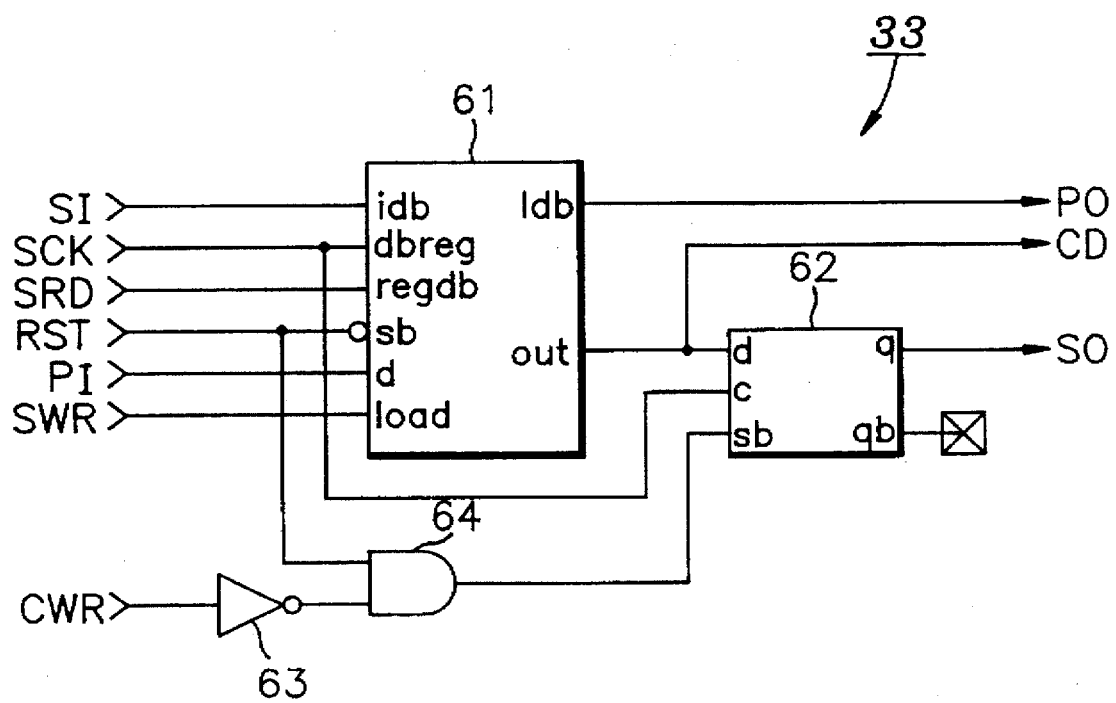
FIG. 10 is a diagram showing details of the third register in FIG. 3.

FIG. 10 shows further details of the third register 33 of FIG. 3 with the same construction as that of FIG. 6 except the signal applied to the terminal rb of the serial data processor 62. An inverter 63 inverts the communication start signal CWR, and an AND gate 64 ANDs the reset signal RST and the output of the inverter 63 and then applies the output thereof to the terminal sb of the serial data processor 62. That is, the third register 33 is initialized by the reset signal RST and the communication start signal CWR.

FIG. 11 is a waveform diagram showing the operation of the I/O device when the data transmission is performed from the smart card to the card reader. With the transition of the reset signal RST to the logic "high" level as shown in 11A of FIG. 11, the first, second and third registers 31, 32 and 33 are removed from the reset state. If the communication start signal CWR is generated as shown in 11B of FIG. 11, the communication mode signal T/RX goes to the logic "low" level as shown in 11C of FIG. 11. Then, the communication mode signal T/RX of logic "low" level is inverted to the logic "high" level through the inverter 36 and then is applied to the NOR gate 38, so that the parity detection signal PBT maintains the logic "low" level as shown in 11J of FIG. 11. That is, the parity detector 35 does not generate the parity detection signal PBT in the transmission mode.

In such a state, if the write signal SWR is generated as shown in 11D of FIG. 11, the first, second and third registers 31, 32, and 33 load the data received through the parallel input terminals PI as shown in 11G of FIG. 11. In this case, as the parallel input terminal PI of the third register 33 is connected to the ground, the third register 33 loads the logic "low" signal and this is transmitted as the start bit. And the second register 32 loads the corresponding data bits on the data bus as shown in FIG. 4. That is, the data registers 41 to 48 in the second register 32 load the data on the data bus in response to the write signal SWR. The parallel data processor 61 as shown in FIGS. 6 to 8 outputs the loaded data through the corresponding detection terminal CD. Thus, the second register 32 loads the data received through the parallel input terminals PI0 to PI7 and then outputs the loaded data through the parallel detection terminals CD0 to CD7. 11E of FIG. 11 shows the load time T1 when the second register 32 loads and outputs the parallel data to the parallel detection terminals CD0 to CD7 in response to the write signal SWR.

After the lapse of the load time T1 as shown in 11D of FIG. 11, the parity operator 34 receives the data outputted from the parallel detection terminals CD0 to CD7 of the second register 32. And then the parity operator 34 logically operates upon the reception data and then generates the operation parity bit DPB. In the parity operator 34, one ends of the exclusive OR gates 51 to 58 are respectively connected to the parallel detection terminals CD0 to CD7 of the second register 32, and the other ends of the exclusive OR gates 52 to 58 are respectively connected to the output terminals of the preceding exclusive OR gates 51 to 57. The other end of the exclusive OR gate 51 is connected to the ground, and the exclusive OR gate 58 outputs the operation parity bit DPB at its output terminal. Thus, the parity operator 34 compares the logic states of the parallel data outputted from the parallel detection terminals CD0 to CD7, and if the total number of the logic ones is an odd number, generates the operation parity bit DPB of logic "1", and if the total number of the logic ones is an even number, generates the operation parity bit DPB of logic "0". In this case, if the input terminal of the exclusive OR gate 51 is connected to the power supply voltage, the parity operator 34 generates the odd parity.

The operation parity bit DPB generated as described above is applied to the exclusive NOR gate 37 and to the parallel input terminal PI of the first register 31. At the transmission mode, the parity detection signal PBT maintains the logic "low" state as shown in FIG. 11J regardless of the logic state of the operation parity bit DPB. At the transmission mode, the operation parity bit DPB should be loaded to the first register 31, and then inserted to the transmission data frame to be transmitted to the card reader. Thus, the parity operator 34 must generate and output the operation parity bit DPB to the parallel input terminal PI of the first register 31 before the write signal SWR is turned off. Therefore, before the write signal SWR is turned off, the parity operator 34 generates the operation parity bit DPB for the parity operation time T2 as shown in 11F of FIG. 11. Then, the first register 31 loads the operation parity bit DPB in response to the write signal SWR as shown in 11D of FIG. 11. In order to load the operation parity bit DPB to the first register 31, the write signal SWR should be maintained for more than the parallel data load time T1 of the second register 32 and the parity operation time T2 of the parity operator 34 as shown in 11D of FIG. 11.

If the write operation of the parallel data is completed with the off state of the write signal SWR, the third register 33 loads the start bit of logic "low" level, the data registers 41 to 48 of the second register 32 load the corresponding data bits, and the first register 31 loads the operation parity bit DPB.

If the write signal SWR becomes off, the shift clock SCK is generated as shown in 11H of FIG. 11. More than ten shift clocks SCK are generated in order to shift a start bit, eight data bits and a parity bit loaded at the registers 31 to 33. If the shift clock SCK is generated as shown in 11H of FIG. 11, the registers 31 to 33 output the loaded data through the serial output terminals SO, and store the outputs of the preceding registers received through their serial input terminals SI. Consequentially, as shown in 11I of FIG. 11, the transmission data frame is converted to the serial data and then is transmitted to the card reader in response to the shift clock SCK.

FIG. 12 is a waveform diagram showing the operation of the I/O device when the data transmission is performed from the card reader to the smart card device. With the transition of the reset signal RST to the logic "high" level as shown in 12A of FIG. 12, the first, second and third registers 31, 32 and 33 are removed from the reset state. Thereafter, if the communication start signal CWR is generated as shown in 12B of FIG. 12, the communication mode signal T/RX goes to the logic "high" level as shown in 12C of FIG. 12. Then, the communication mode signal T/RX of logic "high" level is inverted to the logic "low" level through the inverter 36 and then is applied to the NOR gate 38. Thus, the parity detection signal PBT maintains the logic "low" level until the error parity bit is detected as shown in 12K of FIG. 12. That is, at the reception mode, the logic state of the parity detection signal PBT is determined according to the logic states of the operation parity bit DPB and the reception parity bit RPB.

The data frame transmitted from the card reader starts as the start bit, and at this time, as the start bit is the logic "low" level, the terminal SIO goes from the logic "high" level to the logic "low" level when the card reader starts a data transmission. Thus, if the falling edge signal is detected at the terminal SIO, the shift clock SCK is generated as shown in 12E of FIG. 12. Then, the registers 31 to 33 shift the data received through the serial input terminals SI in response to the shift clock SCK. The serial input terminal SI of the first register 31 is connected to the terminal SIO. The second register 32 is composed of eight data registers 41 to 48 as shown in FIG. 4, and each serial input terminal SI thereof is connected to the serial output terminal SO of its preceding data register. Thus, the registers 31 to 33 shift and store the reception data as shown in 12F of FIG. 12 in response to the shift clock SCK generated as shown in 12E of FIG. 12.

If the generation of the shift clock SCK ends, the first register 31 stores the reception parity bit RPB, the data registers 41 to 48 of the second register 32 store the 8 data bits and the third register 33 stores the start bit. The 8 data bits stored at the second register 32 are outputted to the parallel detection terminals CD0 to CD7 by the parallel data processor 62 as shown in FIGS. 6 to 8. In addition, if the generation of the shift clock SCK ends, the read signal SRD is generated as shown in 12G of FIG. 12 in order to make the controller receive the data frame through the data bus. If the read signal SRD is generated, the outputs of the parallel detection terminals CD0 to CD7 are outputted through the parallel output terminals PO0 to PO7.

At this time, the parity operator 34 logic-operates the data received through the parallel detection terminals CD0 to CD7 for the parity operation time T3 as shown in 12H of FIG. 12 and then generates the operation parity bit DPB. Then, the exclusive NOR gate 37 exclusively NORs the operation parity bit DPB and the reception parity bit RPB to compare the logic states thereof. If the logic state of the reception parity bit RPB is identical to that of the operation parity bit DPB, it means that the reception data are normal, and if it is not identical to that of the operation parity bit DPB, it means that the reception data are in error. Thus, if the above two parity bits have identical logic state, the exclusive NOR gate 37 outputs the logic "high" signal indicating that the reception data are normal, and otherwise, outputs the logic "low" signal indicating that the reception data are in error. In the reception mode, as the NOR gate 38 receives the inverted communication mode signal T/RX of logic "low" level, the logic of the parity detection signal PBT is determined according to the output of the exclusive NOR gate 37. If the exclusive NOR gate 37 outputs the logic "high" signal, the NOR gate 38 outputs the parity detection signal PBT of logic "low" level indicating that the reception data are normal as shown in 12K of FIG. 12, and if the exclusive NOR gate 37 outputs the logic "low" signal, the NOR gate 38 outputs the parity detection signal PBT of logic "high" level indicating that the reception data are in error as shown in 12K of FIG. 12.

During the detection of the parity detection signal PBT, the second register 32 outputs the received serial data to the parallel output terminals PO0 to PO7 for the time T4 as shown in 12J of FIG. 12. Therefore, as shown in 12G of FIG. 12, the read signal SRD should be maintained for more than the time T3 for operating the operation parity bit DPB and the time T4 for outputting the received serial data to the parallel output terminals PO0 to PO7.

At this time, the controller of the smart card device analyzes the logic of the parity detection signal PBT generated as shown in 12K of FIG. 12, and then parallel-loads the data through the data bus as shown in 12J of FIG. 12.

As described above, the I/O device of the smart card according to the present invention is capable of logically operating upon the transmission data to generate the parity bit and inserting the parity bit in the transmission data frame in the transmission mode. And in the reception mode, it is capable of logically operating upon the reception data to generate the operation parity bit, logically comparing the operation parity bit with the reception parity bit, and then determining whether or not the reception data are normal. Accordingly, it is possible to reduce the program load of the controller in the smart card and to perform the rapid data transmission to the card reader.

Those skilled in the art will appreciate that the present invention may be embodied in other specific forms without departing from the spirit or scope of the invention.

What is claimed is:

1. An input/output device of a smart card for performing serial data communication asynchronously with a card reader comprising:

a first register having a first serial input terminal connected to a serial input/output terminal;

a second register having parallel detection terminals, parallel input/output terminals connected to a data bus, and a second serial input terminal connected to a first serial output terminal of said first register;

a third register having a parallel input terminal connected to a ground, a third serial input terminal connected to a second serial output terminal of said second register, and a third serial output terminal connected to said serial input/output terminal;

a parity generator which receives parallel data from said parallel detection terminals of said second register, logically operates upon said parallel data to generate an operation parity bit which is applied to a parallel input indicator terminal of said first register; and a parity detector which receives a reception parity bit from said first register and said operation parity bit from said parity generator and, in a reception mode, compares the logic states of said reception parity bit and said operation parity bit to obtain a parity detection signal indicating whether parity is correct.

2. An input/output device of a smart card according to claim 1, wherein in a transmission mode, said parallel data from said second register is loaded as parallel output data onto said data bus in response to a write signal, said parity generator logically operates upon said parallel output data and generates said operation parity bit, said first register loads said operation parity bit, and data stored in said third, second and first registers is sequentially shifted in response to a shift clock, and wherein in said reception mode, said third, second and first registers sequentially shift and input serial data in response to said shift clock, said second register outputs said parallel data as parallel reception data in response to a read signal, said parity generator logically operates upon said parallel reception data to generate said operation parity bit, compares said operation parity bit with said reception parity bit and then outputs said parity detection signal indicating whether parity is correct.

3. The input/output device according to claim 1, wherein said parity generator comprises a first gate for exclusively ORing said ground voltage and a first bit of said parallel data to generate a first operation data;

second to seventh gates each for exclusively ORing one of first to sixth operation data output from said first to sixth preceding gates and corresponding second to seventh bits of said parallel data to generate second to seventh operation data; and an eighth gate for exclusively ORing said seventh operation data and an eighth bit of said parallel data, to generate an even parity bit.

4. The input/output device according to claim 1, wherein said parity generator comprises a first gate for exclusively ORing a power supply voltage and a first bit of said parallel data to generate a first operation data;

second to seventh gates for exclusively ORing one of first to sixth operation data output from first to sixth preceding gates and corresponding second to seventh bits of said parallel data to generate second to seventh operation data; and an eighth gate for exclusively ORing said seventh operation data and an eighth bit of said parallel data, to generate an odd parity bit.

5. A smart card device for performing serial data communication with a card reader comprising:

an input/output interface having a parity operator and a serial input/output terminal connected to said card reader which, in a reception mode, converts serial data received from said card reader into parallel data, logically operates upon said parallel data to generate an operation parity bit, compares said operation parity bit with a reception parity bit and then outputs a parity detection signal indicating whether parity is correct, and which in a transmission mode, logically operates upon transmission parallel service information data to be transmitted, generates and inserts said operation parity bit in a transmission data frame and converts said transmission parallel service information data into the serial data, to output to said card reader;

an EEPROM having a first region for storing program information and a second region for storing service information; and a controller connected to said input/output interface which, for trammitts said transmission parallel service information data in said transmission mode, receives said parallel data from said input/output interface in response to said parity detection signal in said reception mode, and accesses a corresponding region of said EEPROM using said parallel data to allow for registering, clearing and modifying said service information.

6. The smart card device according to claim 5, wherein said input/output interface comprises;

a first register having a first serial input terminal connected to a serial input/output terminal;

a second register having parallel detection terminals, parallel input/output terminals connected to a data bus, and a second serial input terminal connected to a first serial output terminal of said first register;

a third register having a parallel input terminal connected to a ground, a third serial input terminal connected to a second serial output terminal of said second register, and a third serial output terminal connected to said serial input/output terminal;

a parity generator means which receives said parallel data from said second register, logically operates on said parallel data and generates and applies said operation parity bit to a parallel input terminal of said first register; and a parity detector which receives said reception parity bit of said first register and said operation parity bit of said parity generator, and in said reception mode, compares said reception parity bit of said first register and said operation parity bit to determine if parity is current.

7. The smart card device according to claim 6 wherein, in said transmission mode, said second register parallel-loads said parallel data in response to a write signal, said parity generator logically operates upon said parallel data and then generates said operation parity bit, said first register loads said operation parity bit, and data loaded at said third, second and first registers are sequentially shifted in response to a shift clock, and in said reception mode, said third, second and first registers sequentially shift and input said serial data in response to said shift clock, said second register outputs said parallel data in response to a read signal, said parity generator logically operates upon parallel the reception data to generate said operation parity bit, compares said operation parity bit with said reception parity bit of said first register and then outputs said parity detection signal to indicate whether said two parity bits have identical logic.

8. A smart card device for performing serial data communication with a card reader comprising:

input/output interface having a parity detector and a serial input/output terminal connectable to said card reader, which, in a reception mode, converts serial data received from said card reader into parallel data, logically operates upon said parallel data to generate an operation parity bit, compares said operation parity bit with a reception parity bit and then outputs a parity detection signal to indicate whether parity is correct, and which in a transmission mode, logically operates upon transmission parallel service information data to be transmitted, generates and inserts said operation parity bit in a transmission data frame and converts said transmission parallel data into transmission serial data for output to said card reader;

a mask ROM for storing control program information of said smart card device;

an EEPROM for storing service information of a holder; and a controller connected to said input/output interface which transmits said transmission parallel service information data in said transmission mode, receives said parallel data from said input/output interface in response to said parity detection signal in said reception mode, and accesses to a corresponding region of said EEPROM to allow for registering, clearing and modifying the information.

9. The smart card device according to claim 8, wherein said input/output interface comprises;

- a first register having a first serial input terminal connected to a serial input/output terminal;
- a second register having parallel detection terminals, parallel input/output terminals connected to a data bus, and a second serial input terminal connected to a first serial output terminal of said first register;
- a third register having a parallel input terminal connected to a ground, a third serial input terminal connected to a second serial output terminal of said second register, and a third serial output terminal connected to said serial input/output terminal;
- a parity generator means which receives said parallel data from said second register, logically operates on said parallel data and generates and applies said operation parity bit to a parallel input terminal of said first register; and
- a parity detector which receives said reception parity bit of said first register and said operation parity bit of said parity generator, and in said reception mode, compares said reception parity bit of said first register and said operation parity bit to determine if parity is current.

10. The smart card device according to claim 9 wherein, in said transmission mode, said second register parallel-loads said parallel data in response to a write signal, said parity generator logically operates upon said parallel data and then generates said operation parity bit, said first register loads said operation parity bit, and data loaded at said third, second and first registers are sequentially shifted in response to a shift clock, and in said reception mode, said third, second and first registers sequentially shift and input said serial data in response to said shift clock, said second register outputs said parallel data in response to a read signal, said parity generator logically operates upon parallel the reception data to generate said operation parity bit, compares said operation parity bit with said reception parity bit of said first register and then outputs said parity detection signal to indicate whether said two parity bits have identical logic.

11. A data communication method of a smart card device having an input/output interface composed of a parity register, a data register, a start register and a parity generator, said method comprising the steps of:

- in a transmission mode, loading parallel data from said data register in response to a write signal, logically operating upon parallel data and generating an operation parity bit by said parity generator, loading said operation parity bit by said parity register, and maintaining an enable state of said write signal until said parity bit is generated;

thereafter, sequentially shifting data stored in said start register, said data register and said parity register as serial data in response to a shift clock and then outputting said serial data to said card reader;

in a reception mode, shifting and inputting received serial data applied from said card reader in response to said shift clock and then sequentially storing said received serial data at said start register, data register and parity register; and thereafter, logically operating upon parallel received data applied from said data register and generating said operation parity bit by said parity generator in response to a read signal, comparing a reception parity bit of parity register with that of said operation parity bit and generating a parity detection signal to indicate whether said two parity bits have idential logic, and thus outputting from said data register the said parallel received data.

* * * * *